United States Patent
Delhoume et al.

(10) Patent No.: US 10,638,214 B1
(45) Date of Patent: Apr. 28, 2020

(54) AUTOMATIC USER INTERFACE SWITCHING

(71) Applicant: Bose Corporation, Framingham, MA (US)

(72) Inventors: Alexia Delhoume, Framingham, MA (US); Morgen J. Quintus, Arlington, MA (US); David R. Minich, Natick, MA (US); Sarah Fecko, Hopkinton, MA (US); Denise P. Celuch, Watertown, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 16/229,955

(22) Filed: Dec. 21, 2018

(51) Int. Cl.
 *H04R 1/10* (2006.01)
 *H04R 29/00* (2006.01)
 *G10K 11/178* (2006.01)

(52) U.S. Cl.
 CPC ......... *H04R 1/1041* (2013.01); *G10K 11/178* (2013.01); *H04R 1/1016* (2013.01); *H04R 29/001* (2013.01); *G10K 2210/1081* (2013.01)

(58) Field of Classification Search
 CPC .. H04R 1/1041; H04R 1/1016; H04R 29/001; G10K 11/178; G10K 2210/1081
 USPC .................................................. 381/71.6, 74
 See application file for complete search history.

(56) References Cited

U.S. PATENT DOCUMENTS

| | | | |
|---|---|---|---|
| 8,238,567 B2 | 8/2012 | Burge et al. | |
| 8,238,570 B2 | 8/2012 | Johnson, Jr. et al. | |
| 8,243,946 B2 | 8/2012 | Burge et al. | |
| 8,699,719 B2 | 4/2014 | Johnson, Jr. et al. | |
| 9,743,170 B2 | 8/2017 | Yamkovoy | |
| 9,838,812 B1 | 12/2017 | Shetye et al. | |
| 9,860,626 B2 | 1/2018 | Ergezer et al. | |
| 9,924,255 B2 | 3/2018 | Patel et al. | |
| 10,045,111 B1 | 8/2018 | Bonner et al. | |
| 10,080,092 B2 | 9/2018 | Shetye et al. | |
| 2006/0215847 A1* | 9/2006 | Hollemans ........... | H04R 1/1041 381/74 |
| 2014/0016803 A1* | 1/2014 | Puskarich ............ | H04R 1/1041 381/309 |
| 2019/0045291 A1 | 2/2019 | Kofman | |
| 2019/0052951 A1 | 2/2019 | Kofman et al. | |

* cited by examiner

*Primary Examiner* — Paul Kim
*Assistant Examiner* — Douglas J Suthers
(74) *Attorney, Agent, or Firm* — Bond, Schoeneck & King, PLLC (57) ABSTRACT

An audio system and method directed to sensing whether a first headphone and a second headphone are engaged with, proximate to, or within a user's ear. In one example, if the system detects that the first and second headphones are engaged with or proximate to the user's ear, the first headphone provides a first set of user control settings and the second headphone provides a second set of user control settings. In one example, if the system detects that the first headphone is not engaged with or proximate to the user's ear and the second headphone is engaged with or proximate the user's ear, the second headphone provides controls which include at least one user control from the first set of user controls.

20 Claims, 11 Drawing Sheets

AUTOMATIC USER INTERFACE SWITCHING

BACKGROUND

The present disclosure generally relates to audio systems related devices and methods, and particularly, to controls for headphones.

SUMMARY

All examples and features mentioned below can be combined in any technically possible way.

According to one aspect of the present disclosure, a method for controlling an audio system is provided. The method includes the steps of detecting, at a first sensor of a first headphone, whether the first headphone is engaged with or removed from an ear of a user; detecting, at a second sensor of a second headphone, whether the second headphone is engaged with or removed from an ear of a user; allowing the user to input a first set of user control settings via a first input of the first headphone and a second set of user control settings via a second input of a second headphone if the first sensor determines that the first headphone is engaged with the ear of the user and the second sensor determines that the second headphone is engaged with the ear of the user; and allowing the user to input the first set of user control settings via the second input of the second headphone only if the first sensor determines that the first headphone is removed from the ear of the user and the second sensor determines that the second headphone is engaged with the ear of the user.

In an example, the first input is a first touch capacitive sensor and the second input is a second touch capacitive sensor.

In an example, the first sensor of the first headphone is selected from the group of: a gyroscope, an accelerometer, an Infrared (IR) sensor, a magnetometer an acoustic sensor, a motion sensor, a piezoelectric sensor, a piezoresistive sensor, a capacitive touch sensor, and a magnetic field sensor.

In an example, the first headphone further comprises a first outer surface, the first outer surface comprising a first touch capacitive sensor adapted to receive at least one gesture from the user, and the second headphone further comprises a second outer surface, the second outer surface comprising a second touch capacitive sensor adapted to receive the at least one gesture from the user.

According to another aspect of the present disclosure, an audio system is provided. The audio system includes a first headphone having a first speaker arranged to produce a first audio signal, a first sensor arranged to determine if the first headphone is engaged with or removed from an ear of a user, and a first user interface adapted to receive user input comprising at least one first user control setting of a first set of user control settings. The audio system also includes a second headphone having a second speaker arranged to produce a second audio signal, a second sensor arranged to determine if the second headphone is engaged with or removed from an ear of a user, and a second user interface adapted to: i) receive user input comprising at least one second user control setting of a second set of user control settings if the first sensor determines that the first headphone is engaged with the ear of the user and the second sensor determines that the second headphone is engaged with the ear of the user, and ii) receive user input comprising the at least one first user setting of the first set of user control settings only if the first sensor determines that the first headphone is removed from the ear of the user and the second sensor determines that the second headphone is engaged with the ear of the user.

In an example, the first headphone further includes a first outer surface, the first outer surface including a first touch capacitive sensor.

In an example, the first touch capacitive sensor adapted to receive at least one user input from the user.

In an example, the second headphone further includes a second outer surface, the second outer surface including a second touch capacitive sensor, the second touch capacitive sensor adapted to receive at least one user input.

In an example, the first headphone further includes a first antenna arranged to communicate with the second headphone.

In an example, first headphone further includes a first antenna arranged to communicate with at least one first device and the second headphone further includes a second antenna arranged to communicate with the at least one first device.

In an example, the first user control of the first set of user controls is selected from the group of: increase volume of the first audio signal and second audio signal; decrease volume of the first audio signal and second audio signal; start the first audio signal and the second audio signal; stop the first audio signal and the second audio signal; answer a first phone call; decline the first phone call, accept a first notification, dismiss the first notification; and access a voice assistant.

In an example, the at least one second user control setting is selected from the group of: display a first battery level; activate a noise cancellation mode; deactivate the noise cancellation mode; and adjust a level of the noise cancellation mode.

According to a further aspect of the present disclosure, an audio system is provided. The audio system includes a first headphone having a first speaker arranged to produce a first audio signal, a first sensor arranged to determine if the first headphone is engaged with or removed from an ear of a user, a first user interface adapted to receive user input comprising at least one first user control setting of a first set of user control settings. The audio system further includes a second headphone having a second speaker arranged to produce a second audio signal, a second sensor arranged to determine if the second headphone is engaged with or removed from an ear of a user, and a second user interface adapted to: i) receive user input comprising at least one second user control setting of a second set of user control settings if the first sensor determines that the first headphone is engaged with the ear of the user and the second sensor determines that the second headphone is engaged with the ear of the user, and ii) receive user input comprising the at least one first user setting of the first set of user control settings and the at least one second user control setting of the second set of user control settings only if the first sensor determines that the first headphone is removed from the ear of the user and the second sensor determines that the second headphone is engaged with the ear of the user.

In an example, the first headphone further includes a first outer surface, the first outer surface including a first touch capacitive sensor.

In an example, the first touch capacitive sensor adapted to receive at least one user input from the user.

In an example, the second headphone further includes a second outer surface, the second outer surface including a second touch capacitive sensor, the second touch capacitive sensor adapted to receive at least one user gesture.

In an example, the first headphone further includes a first antenna arranged to communicate with the second headphone.

In an example, the first headphone further includes a first antenna arranged to communicate with at least one first device and the second headphone further includes a second antenna arranged to communicate with the at least one first device.

In an example, the first user control of the first set of user controls is selected from the group of: increase volume of the first audio signal and second audio signal; decrease volume of the first audio signal and second audio signal; start the first audio signal and the second audio signal; stop the first audio signal and the second audio signal; answer a first phone call; decline the first phone call, accept a first notification, dismiss the first notification; and access a voice assistant.

In an example, the at least one second user control setting is selected from the group of: display a first battery level; activate a noise cancellation mode; deactivate the noise cancellation mode; and adjust a level of the noise cancellation mode.

DETAILED DESCRIPTION

Wireless headphones have the capacity to accept user controls via inputs built into each headphone such that a user can control their audio experience from one or both of their wireless headphones. However, due to form factor restrictions, in some instances certain controls are provided on a first headphone, while a separate set of controls is provided on a second headphone. As a result of this configuration, functionality/control may be lost if the user removes one of the headphones from their one of their ears.

Accordingly, the present disclosure provides audio systems and methods directed to sensing whether one or both headphones are engaged with, proximate to, or within a user's ear. In one example, if the system detects that a first headphone and a second headphone are engaged with or proximate to a user's ear, the first headphone provides a first set of user control settings and the second headphone provides a second set of user control settings. In another example, if the system detects that the first headphone is not engaged with or proximate to the user's ear and the second headphone is, the second headphone provides a different set of user controls, which may include at least one user control from the first set of user controls and at least one user control from the second set of user controls. In a further example, if the system detects that the second headphone is not engaged with or proximate to the user's ear and the first headphone is, the first headphone provides either the first set of user control settings or a different set of user controls, which may include at least one user control from the second set of user controls and at least one user control from the first set of user controls.

Figure 1:
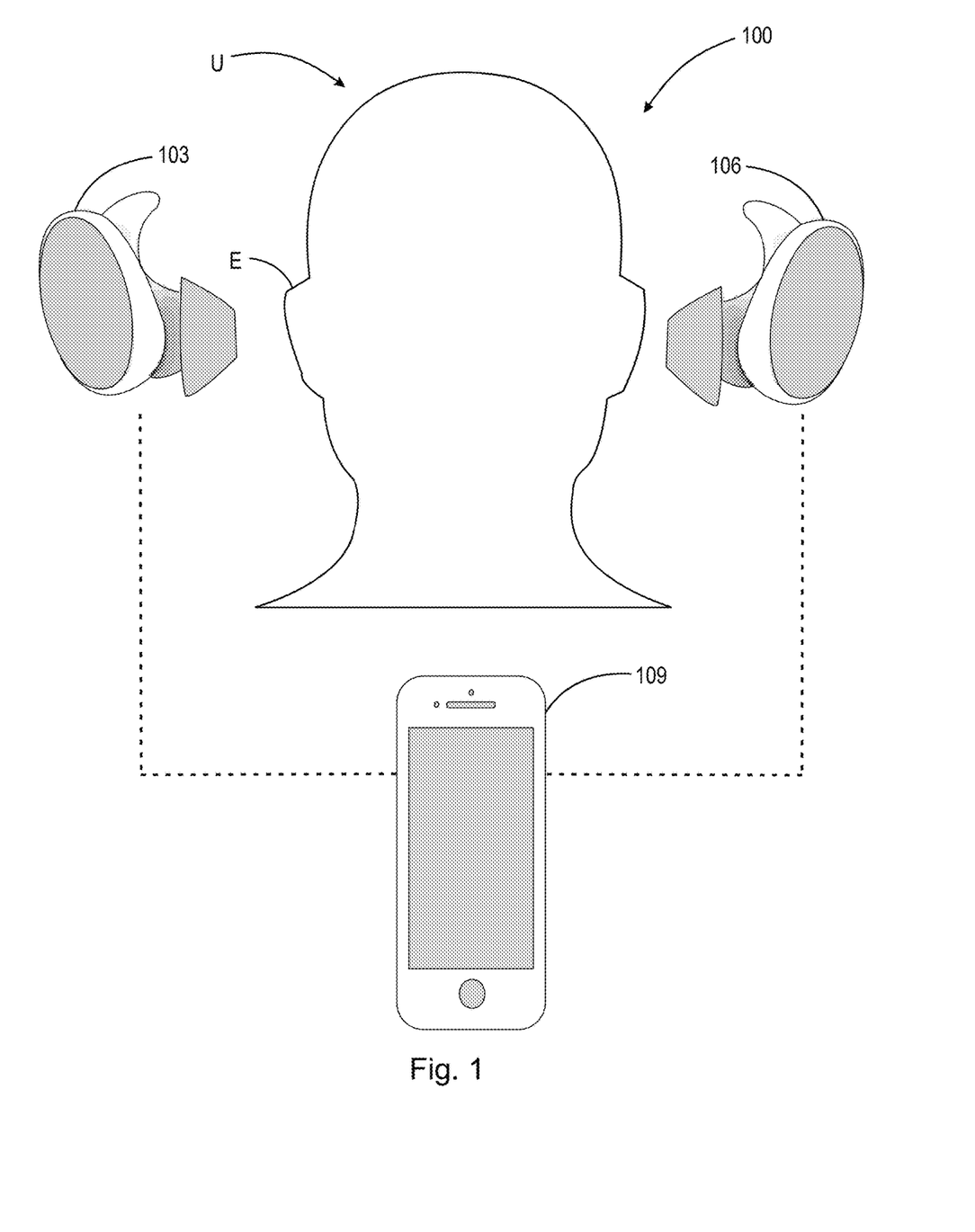
FIG. 1 illustrates an example of an audio system of the present disclosure.

The term "headphone" is intended to mean a device that fits around, on, in, or near an ear and that radiates acoustic energy into or towards the ear canal. Headphones are sometimes referred to as earphones, earpieces, headsets, earbuds or sport headphones, and can be wired or wireless. A headphone includes an acoustic driver to transduce audio signals to acoustic energy. The acoustic driver may be housed in an earcup. While some of the figures and descriptions following may show a single headphone, a headphone may be a single stand-alone unit or one of a pair of headphones (each including a respective acoustic driver and earcup), one for each ear. A headphone may be connected mechanically to another headphone, for example by a headband and/or by leads that conduct audio signals to an acoustic driver in the headphone. A headphone may include components for wirelessly receiving audio signals. A headphone may include components of an active noise reduction (ANR) system. Headphones may also include other functionality such as a microphone so that they can function as a headset. While FIG. 1 shows an example of an around-ear headset, in other examples the headset may be an in-ear, on-ear, or near-ear headset. In some examples, a headphone may be an open-ear device that includes an acoustic driver to radiate acoustic energy towards the ear canal while leaving the ear open to its environment and surroundings.

Referring now to the drawings, FIG. 1 schematically illustrates audio system 100. Audio system 100 generally includes first headphone 103, second headphone 106, and first device 109. First headphone 103 and second headphone 106 are both arranged to communicate with first device 109 and/or communicate to each other. First device 109 may be any device capable of establishing a connection with first headphone 103 and/or second headphone 106, either wirelessly through wireless protocols known in the art, or via a wired connection, i.e., via a cable capable of transmitting a data signal from first device 109 to first headphone 103 or second headphone 106. In one example, first device 109 is a smartphone having a computer executable application installed thereon such that the connection between first device 109, first headphone 103 and/or second headphone 106 can be mutually established using a user interface on first device 109.

Figure 2A:
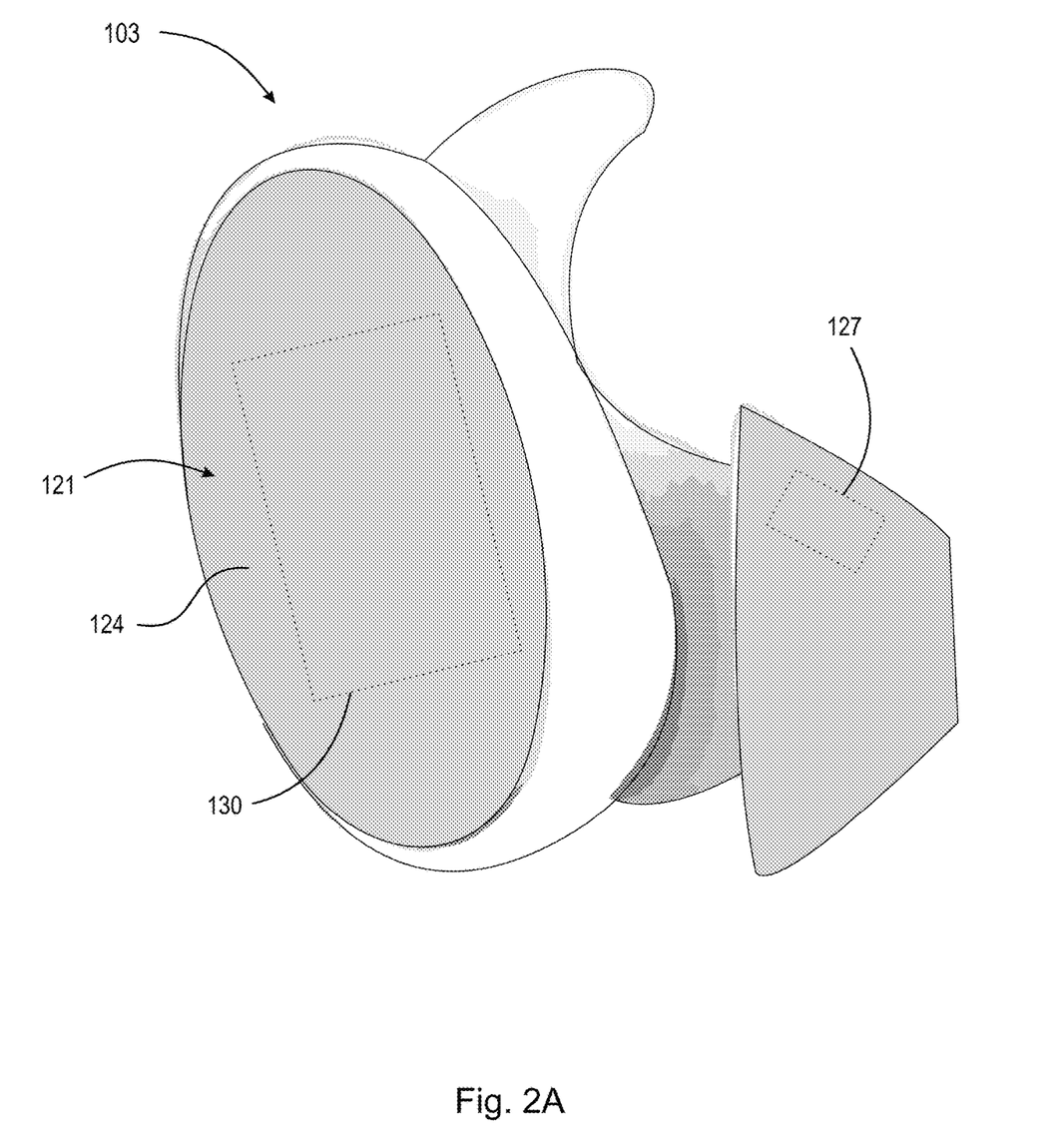
FIG. 2A illustrates a first headphone according to an example of the present disclosure.

FIG. 2A illustrates first headphone 103. First headphone 103 includes a housing, which (referring to FIG. 3A) further includes first speaker 112, arranged to reproduce an audio signal, and first antenna 118. The first audio signal may correspond to data related to at least one digital audio file, which can be streamed over a wireless connection to first device 109 or first headphone 103, stored in first memory 136 (discussed below), or stored in the memory of first device 109. First antenna 118 is arranged to send and receive wireless communication information from, e.g., second headphone 106 or first device 109. Returning to FIG. 2A, the housing further includes first outer surface 121 having a sensor arranged thereon. In one example, the sensor on first outer surface 121 of first headphone 103 is a touch capacitive sensor, e.g., first touch capacitive sensor 124. First touch capacitive sensor 124 is arranged to receive at least one user input corresponding to at least one first user control setting 139 of first set of user control settings 142 discussed with reference to FIG. 3A. At least one user input can include a swipe gesture (e.g., movement across touch capacitive sensor 124), a single-tap, a double-tap (tapping at least two times over a predetermined period of time), triple-tap (tapping at least three times over a predetermined period of time) or any other rhythmic cadence/interaction with touch capacitive sensor 124. It should also be appreciated that at least one user input could be an input from a sensor such as a gyroscope or accelerometer, e.g., when user U removes first headphone 103 ear E, the gyroscope or accelerometer may measure a specified rotation, acceleration, or movement, indicative of user U removing the first headphone 103 from ear E. Additionally, first headphone 103 may also include first sensor 127 in order to detect proximity to or engagement with ear E of user U. Although shown in FIG. 2A as being arranged on an ear tip of first headphone 103, first sensor 127 could alternatively be arranged on or within the housing of first headphone 103. First sensor can be any of: a gyroscope, an accelerometer, a magnetometer, an infrared (IR) sensor, an acoustic sensor (e.g., a microphone or acoustic driver), a motion sensor, a piezoelectric sensor, a piezoresistive sensor, a capacitive sensor, a magnetic field sensor, or any other sensor known in the art capable of determining whether first headphone 103 is proximate to, engaged with, within, or removed from ear E of user U.

Figure 3A:
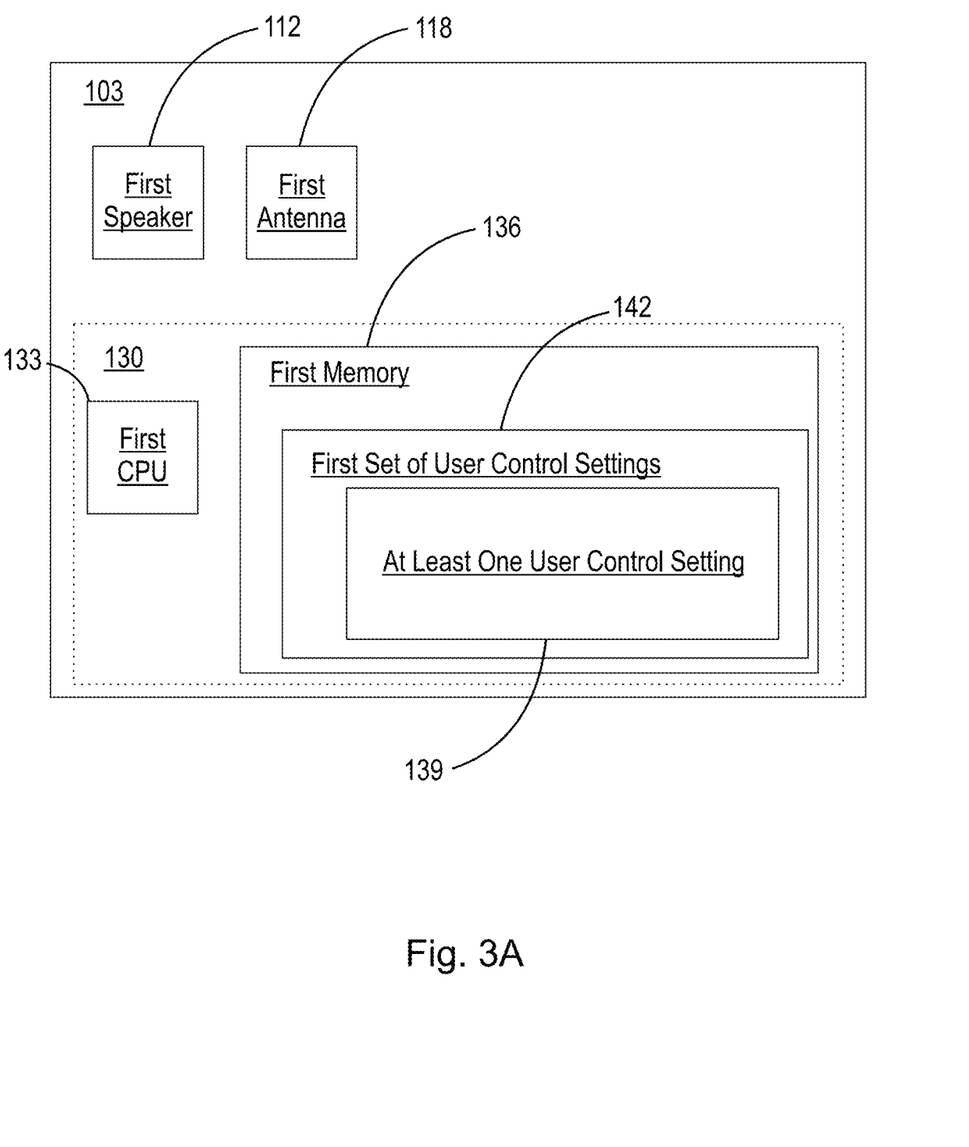
FIG. 3A schematically illustrates one example configuration of components included in a first headphone according to the present disclosure.

First headphone 103 further includes first user control module 130. With reference now to FIG. 3A, in an example, first user control module 130 includes at least first Central Processing Unit (CPU) 133 and first memory 136. The first CPU 133 and first memory 136 of first user control module 130 are arranged to receive, send, store, and execute at least one first user control setting 139 of a first set of user control settings 142 (first CPU 133, first memory 136, at least one first user control setting 139, and the first set of user control settings 142 are shown in FIG. 3A). In an example, first set of user control settings 142 are intended to be the main set of user control settings and can include settings such as, but not limited to: increase or decrease volume of the audio signal 139A (shown in FIG. 5) being reproduced by the audio system 100; start/play/stop/pause the audio signal 139B (shown in FIG. 5) being reproduced by the audio system 100; answer or decline a phone call 139C (shown in FIG. 5); accept or dismiss a notification 139D (shown in FIG. 5); and access a voice assistant 139E (shown in FIG. 5), such as Alexa, Google Assistant, or Siri.

Figure 2B:
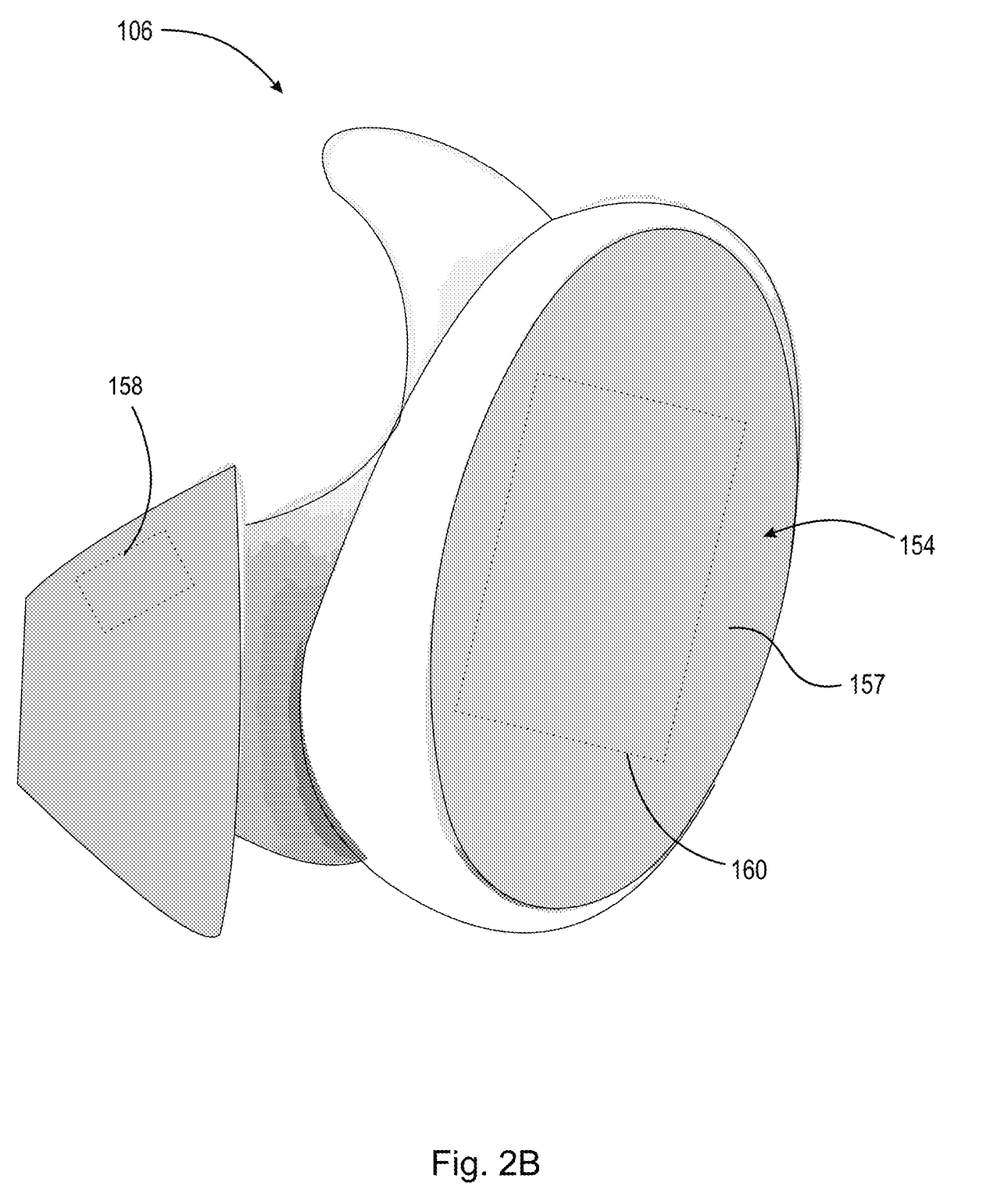
FIG. 2B illustrates a second headphone according to an example of the present disclosure.

FIG. 2B illustrates second headphone 106. Second headphone 106 also includes a housing, which (referring to FIG. 3B) further includes second speaker 145 arranged to reproduce a second audio signal and second antenna 151. The second audio signal may correspond to data related to at least one digital audio file which can be streamed over a wireless connection to first device 109 or second headphone 106, stored in second memory 166 (discussed below), or stored in the memory of first device 109. Second antenna 151 is arranged to send and receive wireless communication information from, e.g., first headphone 103 or first device 109. In one example, the sensor on second outer surface 154 of second headphone 106 is a touch capacitive sensor, e.g., second touch capacitive sensor 157. Second touch capacitive sensor 157 is arranged to receive at least one user input corresponding to at least one second user control setting 169 of second set of user control settings 172 discussed below. As discussed above with respect to first headphone 103, the at least one user input can include a swipe gesture (e.g., movement across touch capacitive sensor 157), a single-tap, a double-tap (tapping at least two times over a predetermined period of time), triple-tap (tapping at least three times over a predetermined period of time) or any other rhythmic cadence/interaction with touch capacitive sensor 157. Additionally, second headphone 106 may also include second sensor 158 in order to detect proximity to or engagement with ear E of user U. Although shown in FIG. 2B as being arranged on an ear tip of second headphone 106, second sensor 158 could alternatively be arranged on or within the housing of second headphone 106. second sensor 158 can be any of: a gyroscope, an accelerometer, a magnetometer, an infrared (IR) sensor, an acoustic sensor (e.g., a microphone or acoustic driver), a motion sensor, a piezoelectric sensor, a piezoresistive sensor, a capacitive sensor, a magnetic field sensor, or any other sensor known in the art capable of determining whether second headphone 106 is proximate to, engaged with, within, or removed from ear E of user U.

Figure 3B:
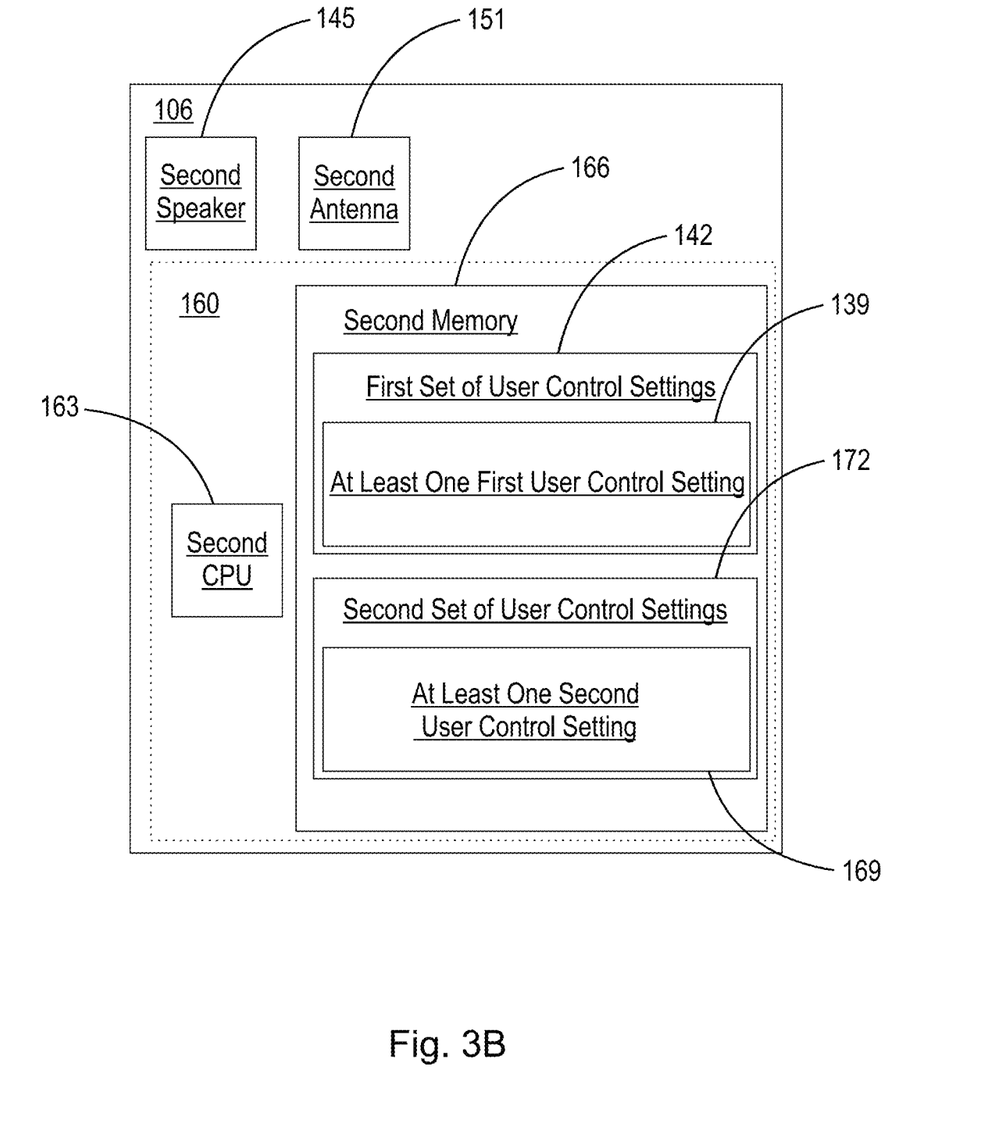
FIG. 3B schematically illustrates one example configuration of components included in a second headphone according to the present disclosure.

Second headphone 106 further includes second user control module 160. With reference now to FIG. 3B, in an example, second user control module 160 includes at least one second Central Processing Unit (CPU) 163 and second memory 166. The second CPU 163 and second memory 166 of second user control module 160 are arranged to receive, send, store, and execute at least one second user control setting 169 of a second set of user control settings 172 (second CPU 163, second memory 166, at least one second user control setting 169, and the second set of user control settings 172 are shown in FIG. 3B). In an example, second set of user control settings 172 are intended to be the secondary set of user control settings and can include settings such as, but not limited to: display a first battery level 169A, adjust noise cancellation 169B (shown in FIG. 5), activate a noise cancellation mode (not shown); and deactivate the noise cancellation mode (not shown). It should be appreciated that first headphone 103 and second headphone 106 are swappable, i.e., either headphone can act as the "primary" headphone having default access to first set of user control settings 142 and the other can act as the "secondary" headphone, i.e., having default access to second set of user control settings 172. In other words, user U may for example, configure, via first device or otherwise, whether the first headphone 103 or the second headphone 106 is the default "primary control" headphone. For example, as discussed herein, first headphone 103 is the primary control headphone in that the first set of user control settings 142 is presumed to be the primary controls. It should be appreciated that either headphone, i.e., first headphone 103 or second headphone 106 can be associated with first set of user control settings 142 or second set of user control settings 172 by default. It should further be appreciated that, first user control module 130 of first headphone 103 and second user control module 160 of second headphone 106 can utilize a common, or shared, processor and memory arranged within either first user control module 130, second user control module 160, first device 109, or any other device capable of housing a processor and/or memory and able to establish a connection with first headphone 103 and/or second headphone 106. Additionally, it should be appreciated that the system utilized by the present disclosure need only sense whether one headphone, i.e., first headphone 103 or second headphone 106, is engaged to establish which headphone receives the primary controls and/or secondary controls by default.

During operation of audio system 100, first headphone 103 and/or second headphone 106 can pair (e.g. using known Bluetooth, Bluetooth Low Energy, or other wireless protocol pairing) or connect with first device 109, e.g., a smartphone. An audio stream may be established between first device 109 and first headphone 103, or between first device 109, first headphone 103, and second headphone 106. The audio stream can include data relating to an audio file streamed over a wireless connection or a stored audio file, stored within first device 109 or within first headphone 103 or second headphone 106. In one example, first device 109 establishes a first connection with first headphone 103, which subsequently establishes a second connection with second headphone 106, such that user U perceives the audio data relating to the audio file simultaneously through both first headphone 103 and second headphone 106. In another example, first device 109 establishes a first connection between first device 109 and first headphone 103 as well as a second connection between first device 109 and second headphone 106, again such that user U perceives the audio data relating to the audio file simultaneously through both first headphone 103 and second headphone 106.

In another example, if first sensor 127 determines that first headphone 103 is engaged with, proximate to, or within ear E of user U and that second headphone 106 is engaged with, proximate to, or within the other ear E of user U, first set of user control settings 142 is available to first headphone 103 and second (distinct) set of user control settings 172 (see, e.g., FIG. 3B) is available to second headphone 106. By providing first touch capacitive sensor 124 with at least one user input, e.g., a double-tap, first user control module 130 allows user U to adjust at least one first user control setting 139, e.g., increase volume 139A or any other first user control setting 139B-E (shown in FIG. 5), of the first set of user control settings 142. Additionally, by providing second touch capacitive sensor 157 with at least one user input, e.g., a double-tap, second user control module 160 allows user U to adjust at least one second user control setting 169, for example, adjust noise cancellation 169B or any other second user control setting (e.g., display battery level 169A), of second set of user control settings 172.

If first sensor 127 determines that first headphone 103 is not engaged with, proximate to, or within ear E of user U, and second sensor 158 of second headphone 106 determines that second headphone 106 is engaged with, proximate to, or within ear E of user U, at least one first user control setting 139 of the first set of user control settings 142 becomes available to second headphone 106. In this state, user U can provide second touch capacitive sensor 157 with at least one user input, e.g., a double-tap, and second user control module 160 allows user U to adjust at least one first user control setting 139, increase volume 139A (shown in FIG. 5). In other words, one or more of the first set of user control settings 142 from the first headphone 103 transfers over to second headphone 106. It should be appreciated that the second set of user control settings 172 can remain available to second headphone 106 or at least one second user control setting 169A-B (shown in FIG. 5) can become available to first headphone 103. Of course, it should be appreciated that some or all of the first set of user control settings 142 and some or all of the second set of user control settings 172 can be combined and made available to second headphone 106. It should further be appreciated that when combining one or more user control settings each setting can have a different activation input that can be provided by user U, e.g., double-tapping can indicate one user control setting, while triple-tapping can indicate another user control setting. These different activation inputs can also be dynamically assigned to different user control settings, either automatically or through user input.

If second sensor 158 of second headphone 106 determines that second headphone 106 is not engaged with, proximate to, or within ear E of user U, and first sensor 127 of first headphone 103 determines that first headphone 103 is engaged with, proximate to, or within ear E of user U, the first set of user control settings 142 remains available to first headphone 103. In this state, user U can provide first touch capacitive sensor 124 at least one user input, e.g., a double-tap, and first user control module 130 allows user U to adjust at least one first user control setting 139 available on first headphone 103, e.g., increase volume 139A (shown in FIG. 5). It should be appreciated that the second set of user control settings 172 can remain available to second headphone 106 and/or become available to first headphone 103 if first sensor 127 determines that first headphone 103 is proximate to, engaged with ear E of user U. Additionally, in some examples, second headphone 106 may retain at least one second user control setting 169 of the second set of user control settings 172, so that at least one of the respective user controls settings are available to second headphone 106. Again, it should be appreciated that some or all of the first set of user control settings 142 and some or all of the second set of user control settings 172 can be combined and made available to second headphone 106. It should further be appreciated that when combining one or more user control settings each setting can have a different activation input that can be provided by user U, e.g., double-tapping can indicate one user control setting, while triple-tapping can indicate another user control setting. These different activation inputs can also be dynamically assigned to different user control settings, either automatically or through user input.

FIG. 3A schematically illustrates one example configuration of the components included in the first headphone 103 according to the present disclosure. It should be appreciated that although first memory 136 illustrates storage of only the first set of user control settings 142 first memory 142 could also store the second set of user control settings 172. FIG. 3B schematically illustrates one example configuration of the components included in the second headphone 106 according to the present disclosure. It should be appreciated that although second memory 166 illustrates storage of only the second set of user control settings 172 second memory 166 could also store the first set of user control settings 142. It should further be appreciated that the functions discussed above can be implemented by respective non-transitory computer readable instructions stored on either respective memory of first headphone 103 or second headphone 106, i.e., first memory 136 and second memory 166, or can be stored in memory of first device 109.

Figure 4:
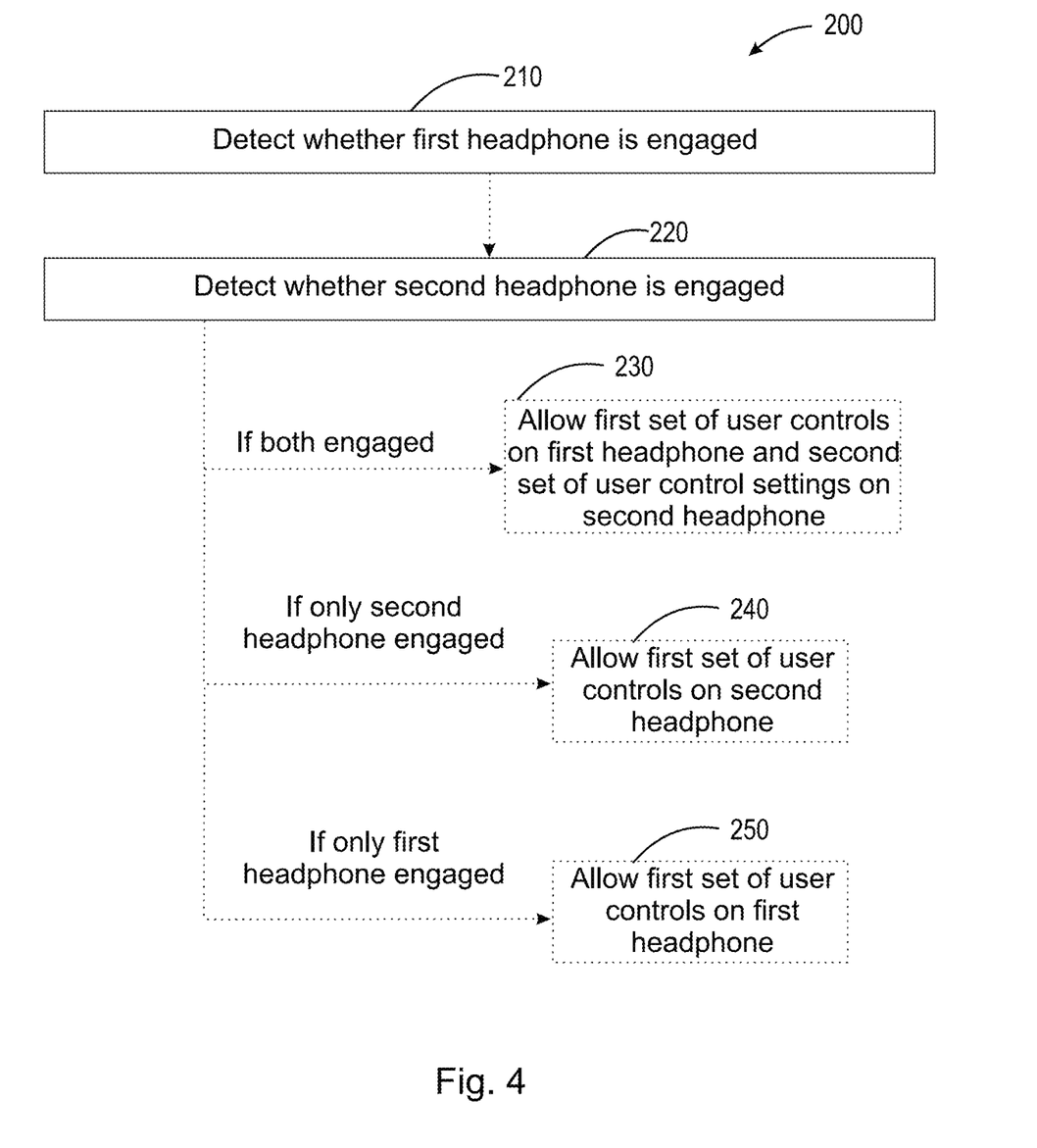
FIG. 4 is a flow-chart illustrating the steps of a method according to the present disclosure.

FIG. 4 is a flow-chart illustrating the steps of a method of controlling an audio system according to the present disclosure. The method 200 includes the steps of: detecting, at a first sensor of a first headphone, whether the first headphone is engaged with or removed from an ear of a user (step 210);

detecting, at a second sensor of a second headphone, whether the second headphone is engaged with or removed from an ear of a user (step 220); allowing the user to input a first set of user control settings via a first input of the first headphone and a second (distinct) set of user control settings via a second input of a second headphone if the first sensor determines that the first headphone is engaged with the ear of the user and the second sensor determines that the second headphone is engaged with the ear of the user (230); and allowing the user to input the first set of user control settings via the second input of the second headphone only if the first sensor determines that the first headphone is removed from the ear of the user and the second sensor determines that the second headphone is engaged with the ear of the user (step 240). Furthermore, the method can include the step of allowing the user to input the first set of user control settings via the first input of the first headphone only if the first sensor determines that the first headphone is engaged with the ear of the user and the second sensor determines that the second headphone is not engaged with the ear of the user (step 250).

FIGS. 5-9 schematically show various conditions that may occur in utilizing the method and system described above.

Figure 5:
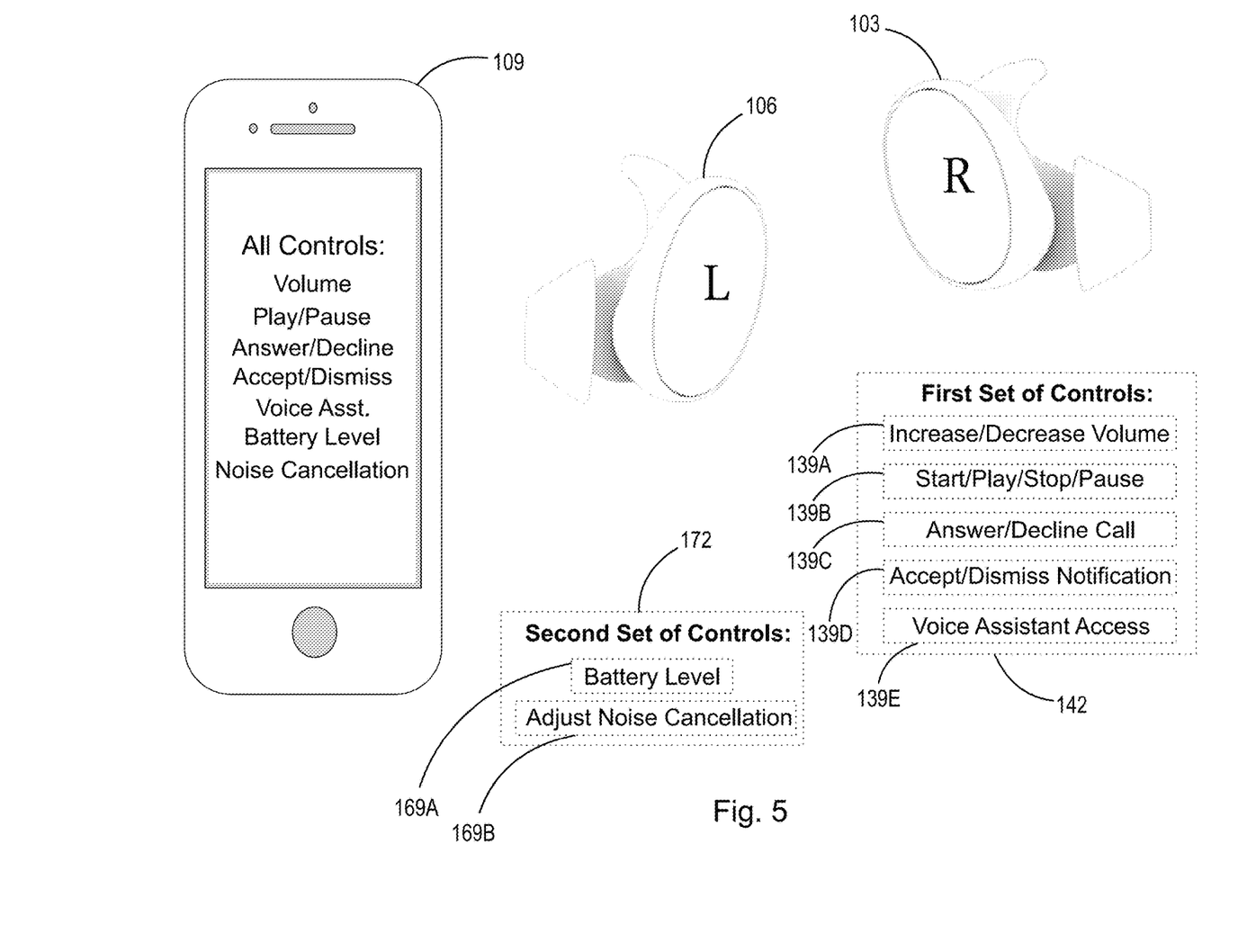
FIG. 5 is a schematic illustration of one example configuration of an audio system according to the present disclosure.

For example, FIG. 5 illustrates a condition where first headphone 103 and second headphone 106 are both detected to be engaged with, proximate to, or within the other ear E of user U. This can be detected via first sensor 127 of first headphone 103 or via second sensor 158 operatively engaged with second headphone 106. If both first headphone 103 and second headphone 106 are both determined to be engaged with ear E of user U, first set of user control settings 142 (or at least one of first user control settings 139A-E) is/are available to the user on first headphone 103 and second set of user control settings 172 (or at least one of second user control settings 169A-B) is/are available to the user on second headphone 106.

Figure 6:
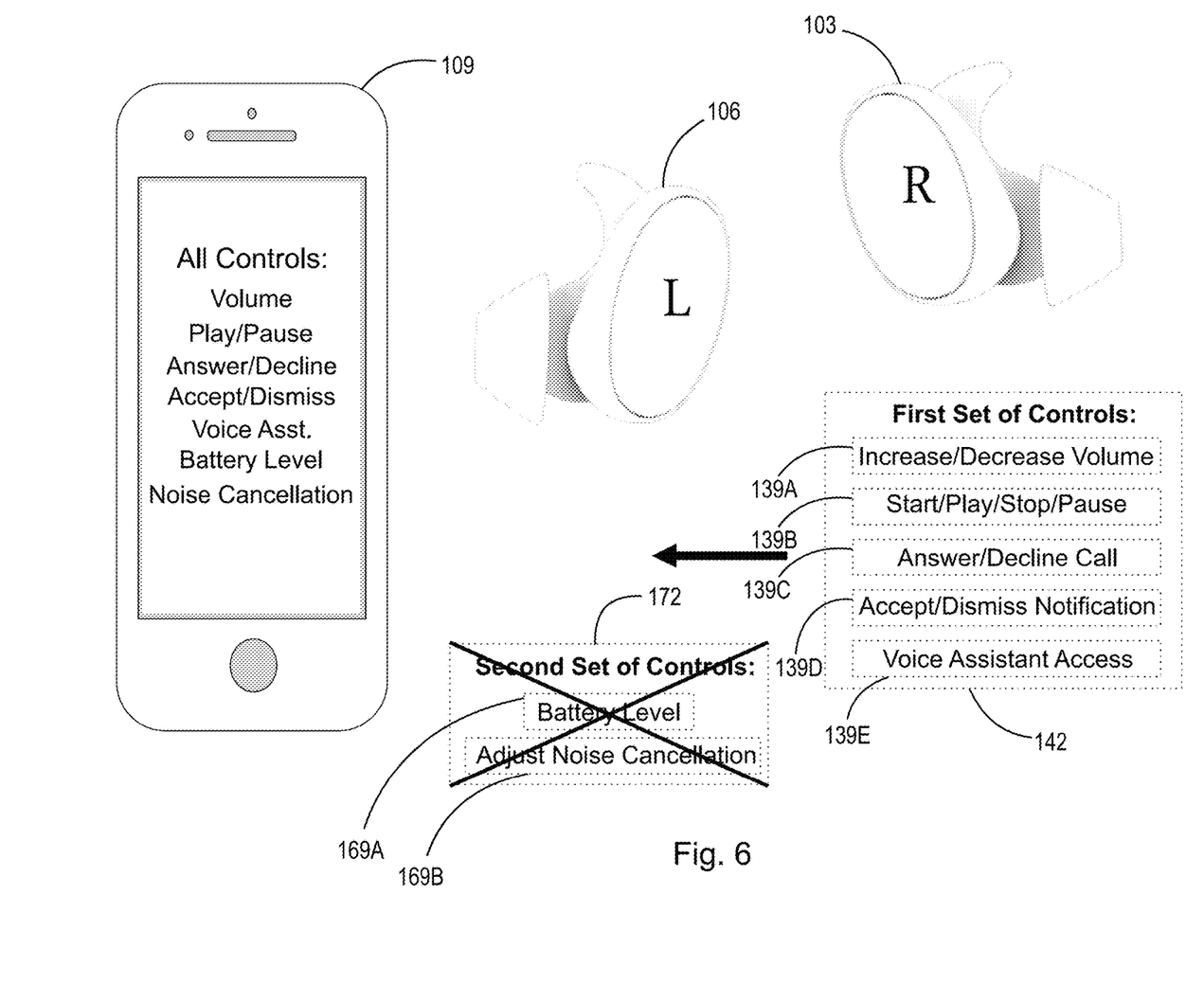
FIG. 6 is a schematic illustration of one example configuration of an audio system according to the present disclosure.

FIG. 6 illustrates a condition where second headphone 106 is detected to be engaged with, proximate to, or within the other ear E of user U but first headphone 103 is not. If only second headphone 106 is determined to be engaged with ear E or user U, first set of user control settings 142 (or at least one of first user control settings 139A-E) becomes available to second headphone 106. In this configuration, first set of user control settings 142 can completely replace second set of user control settings 172 or be added to second set of user control settings 172.

Figure 7:
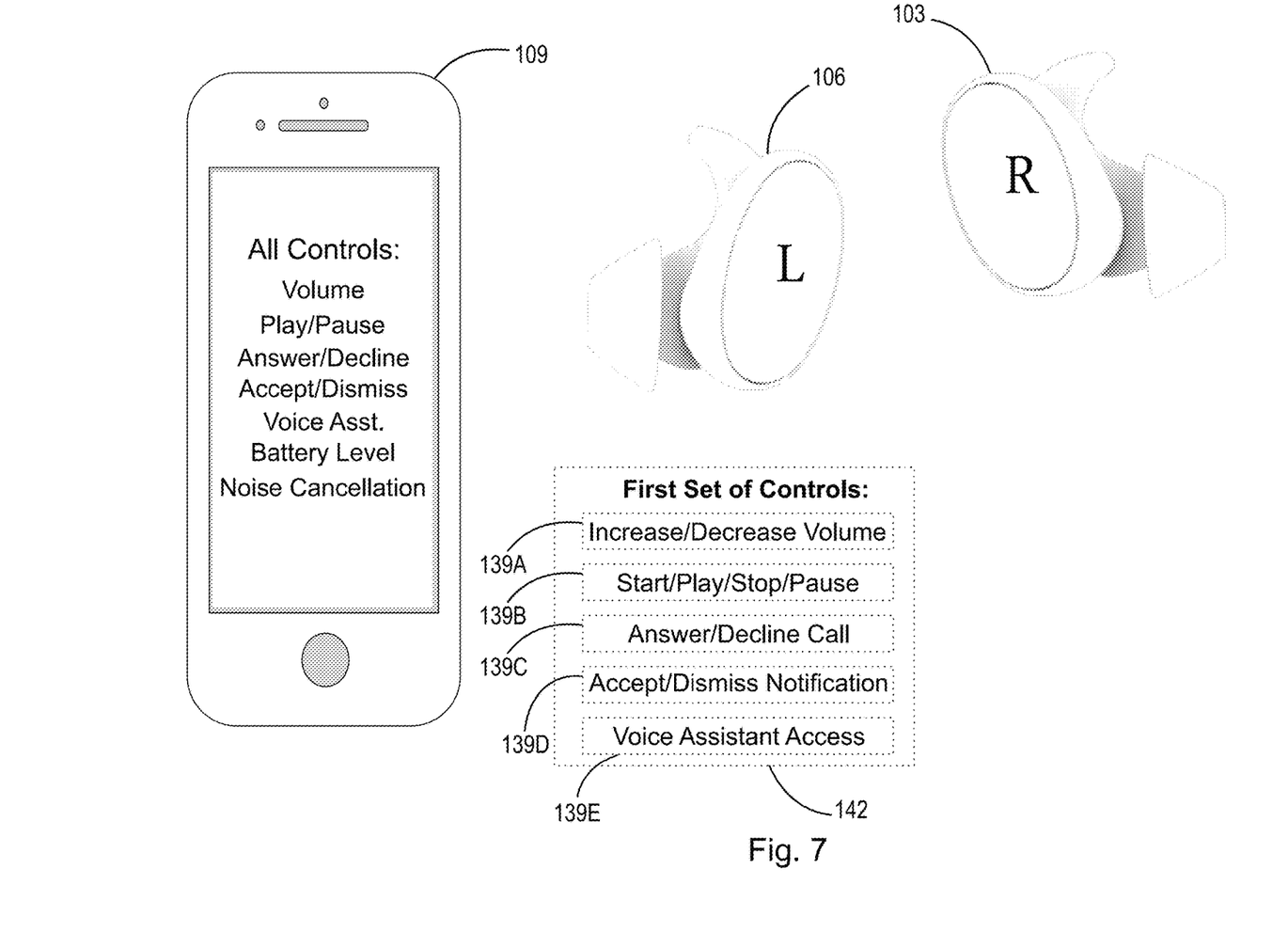
FIG. 7 is a schematic illustration of one example configuration of an audio system according to the present disclosure.

FIG. 7 illustrates one example result of the conditional situation described with reference to FIG. 6 above, i.e., when only second headphone 106 is detected.

Figure 8:
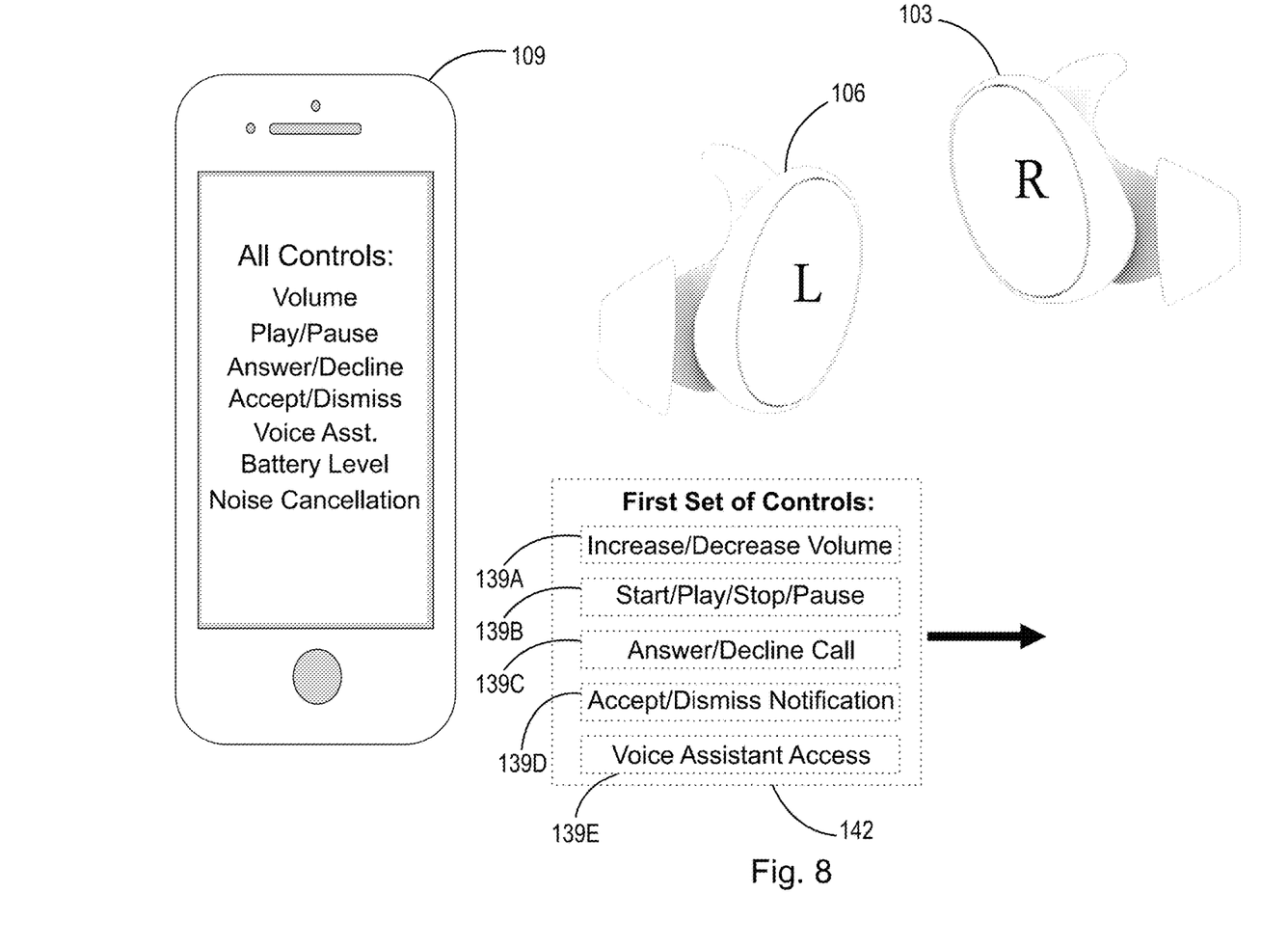
FIG. 8 is a schematic illustration of one example configuration of an audio system according to the present disclosure.
Figure 9:
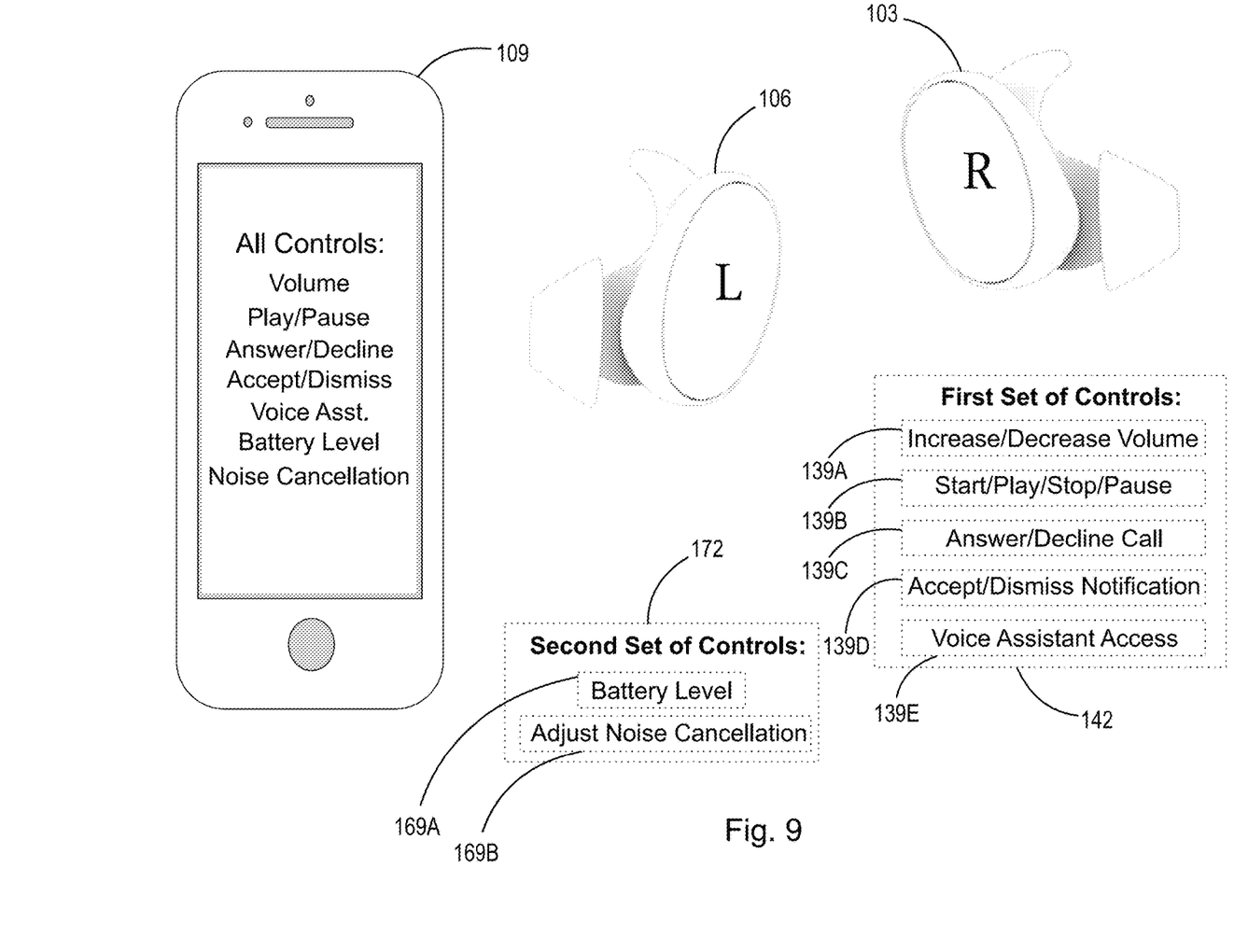
FIG. 9 is a schematic illustration of one example configuration of an audio system according to the present disclosure.

FIG. 8 illustrates the condition described above with respect to FIGS. 6 and 7 where first headphone 103 is subsequently detected to be engaged with, proximate to, or within the other ear E of user U. If only first headphone 103 is determined to be engaged with ear E or user U, first set of user control settings 142 is switched back to first headphone 103 and second set of user control settings 172 become available to second headphone 106 again (the result of which is illustrated in FIG. 9).

It should be appreciated that, as illustrated in FIGS. 5-9, first device 109 can be utilized to configure which user settings are available to first headphone 103 and second headphone 106 for any given condition, e.g., if first headphone 103 is not detected but second headphone 106 is, first device 109 may provide at least one of first user control setting 139A-E and at least one of second user control setting 169A-B to second headphone 106. Similarly, and although not illustrated, it should be appreciated that in a situation where first headphone 103 is detected to be engaged with ear E of user U and second headphone 106 is not detected to be engaged with ear E of user U, second set of user control settings 172 may replace, or be added to, the user control settings already available to first headphone 103. Furthermore, it should be appreciated that the default user control settings associated with the first set of user control settings 142 and the second set of user control settings are swappable, i.e., the default settings available can be originally presented and/or available on either first headphone 103 or second headphone 106. Additionally, the example user control settings set forth above e.g., increase/decrease volume, accept or dismiss a notification, etc., are not exhaustive of all potential user control settings, and it should be appreciated that other user control settings can made available in addition to, or instead of, the example user control settings discussed herein.

The above-described examples of the described subject matter can be implemented in any of numerous ways. For example, some aspects may be implemented using hardware, software or a combination thereof. When any aspect is implemented at least in part in software, the software code can be executed on any suitable processor or collection of processors, whether provided in a single device or computer or distributed among multiple devices/computers.

The present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant may be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The invention claimed is:

1. A method for controlling an audio system, comprising the steps of:
    detecting, at a first sensor of a first headphone, whether the first headphone is engaged with or removed from an ear of a user;
    detecting, at a second sensor of a second headphone, whether the second headphone is engaged with or removed from an ear of the user;
    providing a first set of user control settings to a first user interface associated with the first headphone and providing a second set of user control settings to a second user interface of the second headphone if the first sensor determines that the first headphone is engaged with the ear of the user and the second sensor determines that the second headphone is engaged with the ear of the user; and providing the first set of user control settings to the second user interface associated with the second headphone only if the first sensor determines that the first headphone is removed from the ear of the user and the second sensor determines that the second headphone is engaged with the ear of the user.

2. The method of claim 1, wherein the first input is a first touch capacitive sensor and the second input is a second touch capacitive sensor.

3. The method of claim 1, wherein the first sensor of the first headphone comprises at least one of: a gyroscope, an accelerometer, an infrared (IR) sensor, a magnetometer, an acoustic sensor, a motion sensor, a piezoelectric sensor, a piezoresistive sensor, a capacitive sensor, and a magnetic field sensor.

4. The method of claim 1, wherein the first headphone further comprises a first outer surface, the first outer surface comprising a first touch capacitive sensor adapted to receive at least one gesture from the user, and the second headphone further comprises a second outer surface, the second outer surface comprising a second touch capacitive sensor adapted to receive the at least one gesture from the user.

5. An audio system comprising:
a first headphone, the first headphone comprising:
a first speaker arranged to produce a first audio signal;
a first sensor arranged to determine if the first headphone is engaged with or removed from an ear of a user; and
a first user interface adapted to receive user input comprising at least one first user control setting of a first set of user control settings; and
a second headphone, the second headphone comprising:
a second speaker arranged to produce a second audio signal;
a second sensor arranged to determine if the second headphone is engaged with or removed from an ear of the user; and
a second user interface adapted to: i) receive user input comprising at least one second user control setting of a second set of user control settings if the first sensor determines that the first headphone is engaged with the ear of the user and the second sensor determines that the second headphone is engaged with the ear of the user, and ii) receive user input comprising the at least one first user setting of the first set of user control settings only if the first sensor determines that the first headphone is removed from the ear of the user and the second sensor determines that the second headphone is engaged with the ear of the user.

6. The audio system of claim 5, wherein the first headphone further comprises a first outer surface, the first outer surface comprising a first touch capacitive sensor.

7. The audio system of claim 6, wherein the first touch capacitive sensor comprises the first user interface.

8. The audio system of claim 5, wherein the second headphone further comprises a second outer surface, the second outer surface comprising a second touch capacitive sensor, and the second touch capacitive sensor comprises the second user interface.

9. The audio system of claim 5, wherein the first headphone further comprises a first antenna arranged to communicate with the second headphone.

10. The audio system of claim 5, wherein the first headphone further comprises a first antenna arranged to communicate with at least one first device and the second headphone further comprises a second antenna arranged to communicate with the at least one first device.

11. The audio system of claim 5, wherein the first user control of the first set of user controls comprises at least one of: increase volume of the first audio signal and second audio signal;
decrease volume of the first audio signal and second audio signal; start the first audio signal and the second audio signal; stop the first audio signal and the second audio signal; answer a first phone call; decline the first phone call; accept a first notification; dismiss the first notification;
and access a voice assistant.

12. The audio system of claim 5, wherein the at least one second user control setting comprises at least one of: display or announce a first battery level; activate a noise cancellation mode; deactivate the noise cancellation mode; and adjust a level of the noise cancellation mode.

13. An audio system comprising:
a first headphone, the first headphone comprising:
a first speaker arranged to produce a first audio signal;
a first sensor arranged to determine if the first headphone is engaged with or removed from an ear of a user; and
a first user interface adapted to receive user input comprising at least one first user control setting of a first set of user control settings; and
a second headphone, the second headphone comprising:
a second speaker arranged to produce a second audio signal;
a second sensor arranged to determine if the second headphone is engaged with or removed from an ear of the user; and
a second user interface adapted to: i) receive user input comprising at least one second user control setting of a second set of user control settings if the first sensor determines that the first headphone is engaged with the ear of the user and the second sensor determines that the second headphone is engaged with the ear of the user, and ii) receive user input comprising the at least one first user setting of the first set of user control settings and the at least one second user control setting of the second set of user control settings only if the first sensor determines that the first headphone is removed from the ear of the user and the second sensor determines that the second headphone is engaged with the ear of the user.

14. The audio system of claim 13, wherein the first headphone further comprises a first outer surface, the first outer surface comprising a first touch capacitive sensor.

15. The audio system of claim 14, wherein the first touch capacitive sensor comprises the first user interface.

16. The audio system of claim 13, wherein the second headphone further comprises a second outer surface, the second outer surface comprising a second touch capacitive sensor, and the second touch capacitive sensor comprises the second user interface.

17. The audio system of claim 13, wherein the first headphone further comprises a first antenna arranged to communicate with the second headphone.

18. The audio system of claim 13, wherein the first headphone further comprises a first antenna arranged to communicate with at least one first device and the second headphone further comprises a second antenna arranged to communicate with the at least one first device.

19. The audio system of claim 13, wherein the first user control of the first set of user controls comprises at least one of: increase volume of the first audio signal and second audio signal; decrease volume of the first audio signal and second audio signal; start the first audio signal and the second audio signal; stop the first audio signal and the second audio signal; answer a first phone call; decline the first phone call; accept a first notification; dismiss the first notification; and access a voice assistant.

20. The audio system of claim 13, wherein the at least one second user control setting comprises at least one of: display or announce a first battery level; activate a noise cancellation mode; deactivate the noise cancellation mode; and adjust a level of the noise cancellation mode.

\* \* \* \* \*